(12) United States Patent
Zhao et al.

(10) Patent No.: US 7,925,645 B2
(45) Date of Patent: Apr. 12, 2011

(54) DYNAMIC METADATA FILTERING FOR CLASSIFIER PREDICTION

(75) Inventors: Lei Zhao, Sammamish, WA (US); Zhanliang Chen, Sammamish, WA (US); Yanbiao Zhao, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 676 days.

(21) Appl. No.: 11/779,984

(22) Filed: Jul. 19, 2007

(65) Prior Publication Data

US 2009/0024604 A1 Jan. 22, 2009

(51) Int. Cl.
*G06F 17/30* (2006.01)
*G06F 17/00* (2006.01)

(52) U.S. Cl. .......................... 707/714; 707/601; 707/736
(58) Field of Classification Search .................. 707/3, 4, 707/5, 601, 602, 736, 705, 714, 706, 713, 707/737, 752, 753, 754
See application file for complete search history.

(56) References Cited

U.S. PATENT DOCUMENTS

| | | |
|---|---|---|
| 6,460,049 B1 | 10/2002 | Becker et al. |
| 6,621,936 B1 | 9/2003 | Kondo et al. |
| 6,678,421 B1 | 1/2004 | Daniell et al. |
| 6,741,974 B1 | 5/2004 | Harrison et al. |
| 6,782,377 B2 | 8/2004 | Agarwal et al. |
| 7,043,490 B2 * | 5/2006 | Choy et al. ........................... 1/1 |
| 7,046,848 B1 * | 5/2006 | Olcott ............................ 382/176 |
| 7,117,208 B2 | 10/2006 | Tamayo et al. |
| 7,418,456 B2 * | 8/2008 | Charlet et al. ........................ 1/1 |
| 7,627,564 B2 * | 12/2009 | Yao et al. .............................. 1/1 |
| 2002/0147725 A1 * | 10/2002 | Janssen et al. ................. 707/100 |
| 2004/0064464 A1 | 4/2004 | Forman et al. |
| 2004/0122646 A1 * | 6/2004 | Colossi et al. .................. 703/22 |
| 2005/0187940 A1 | 8/2005 | Lora et al. |
| 2006/0120609 A1 | 6/2006 | Ivanov et al. |
| 2006/0179050 A1 * | 8/2006 | Giang et al. ....................... 707/5 |
| 2006/0277173 A1 | 12/2006 | Li et al. |

OTHER PUBLICATIONS

Author: Nir Friedman et al.; Title: Bayesian Network Classifiers; Date: 1997; Publisher: Kluwer Academic Publishers.; pp. 131-163.*
Vassilis Athitsos, et al., "Efficient Nearest Neighbor Classification Using A Cascade of Approximate Similarity Measures," Boston University Computer Science Tech. Report No. 2005-009, Apr. 6, 2005 (pp. 1-8), http://www.cs.bu.edu/techreports/pdf/2005-009-nearest-neighbor-classification.pdf.
Clark Labs, "Upgrades What's New in the Andes Edition," Clark University (2003) (pp. 1-13), http://www.clarklabs.org/products/upgrades.cfm.
Massimo Marchiori, "The limits of Web metadata, and beyond," The World Wide Web consortium (W3C), MIT Laboratory for Computer Science, http://www.w3.org/People/Massimo/papers/TheLimitsOfWebMetadataAndBeyond.pdf.

* cited by examiner

*Primary Examiner* — Tony Mahmoudi
*Assistant Examiner* — MD. I Uddin
(74) *Attorney, Agent, or Firm* — Merchant & Gould

(57) ABSTRACT

A classifier is used to predict relevant results with arbitrary filtering conditions specified by the user. The classifier model is stored as a database table and joined with a metadata properties table instead of calculating the query result probability using the full classifier model. A user-specified query based filter is applied to the joined tables to obtain the list of documents satisfying the filter. The probability is then computed using the sub-model.

18 Claims, 6 Drawing Sheets

DYNAMIC METADATA FILTERING FOR CLASSIFIER PREDICTION

BACKGROUND

Document search in digital libraries, the Internet, and organizational intranets is best served by a combination of metadata processing and content searching. Some search systems utilize classifiers, which are statistical models built on a set of training data, to predict relevant results. In addition to typical challenges for searches such as having to rely on content if metadata is absent, erroneous, or incomplete, data matrices used by classifiers are typically sparse.

Another challenge in using classifiers for predicting search results is that many classifiers built with various learning technologies do not natively support metadata property filtering of their predictions. Post-processing of the predictions is one approach to address the problem, but a significant performance impact can be expected with post-processing.

Often for reasons of economy or practicality, a service platform that provides customers with the service of searching sets of documents that have been annotated with metadata properties may not be able to utilize prediction.

SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments are directed to enabling use of classifiers in searches with metadata property filtering by joining a classifier model table and a metadata property table while applying a metadata filter. A query probability may then be computed without having to process the sparse classifier matrix.

These and other features and advantages will be apparent from a reading of the following detailed description and a review of the associated drawings. It is to be understood that both the foregoing general description and the following detailed description are explanatory only and are not restrictive of aspects as claimed.

DETAILED DESCRIPTION

As briefly described above, documents with metadata properties may be dynamically filtered by joining a classifier model table and the metadata property table for filtering the metadata based on a query enabling use of classifier models in predicting relevance of a document for a user defined query. In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and the like. Embodiments may also be practiced in distributed computing environments where tasks are performed by remote processing devices that are linked through a communications network. In a distributed computing environment, program modules may be located in both local and remote memory storage devices.

Embodiments may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

Figure 1:
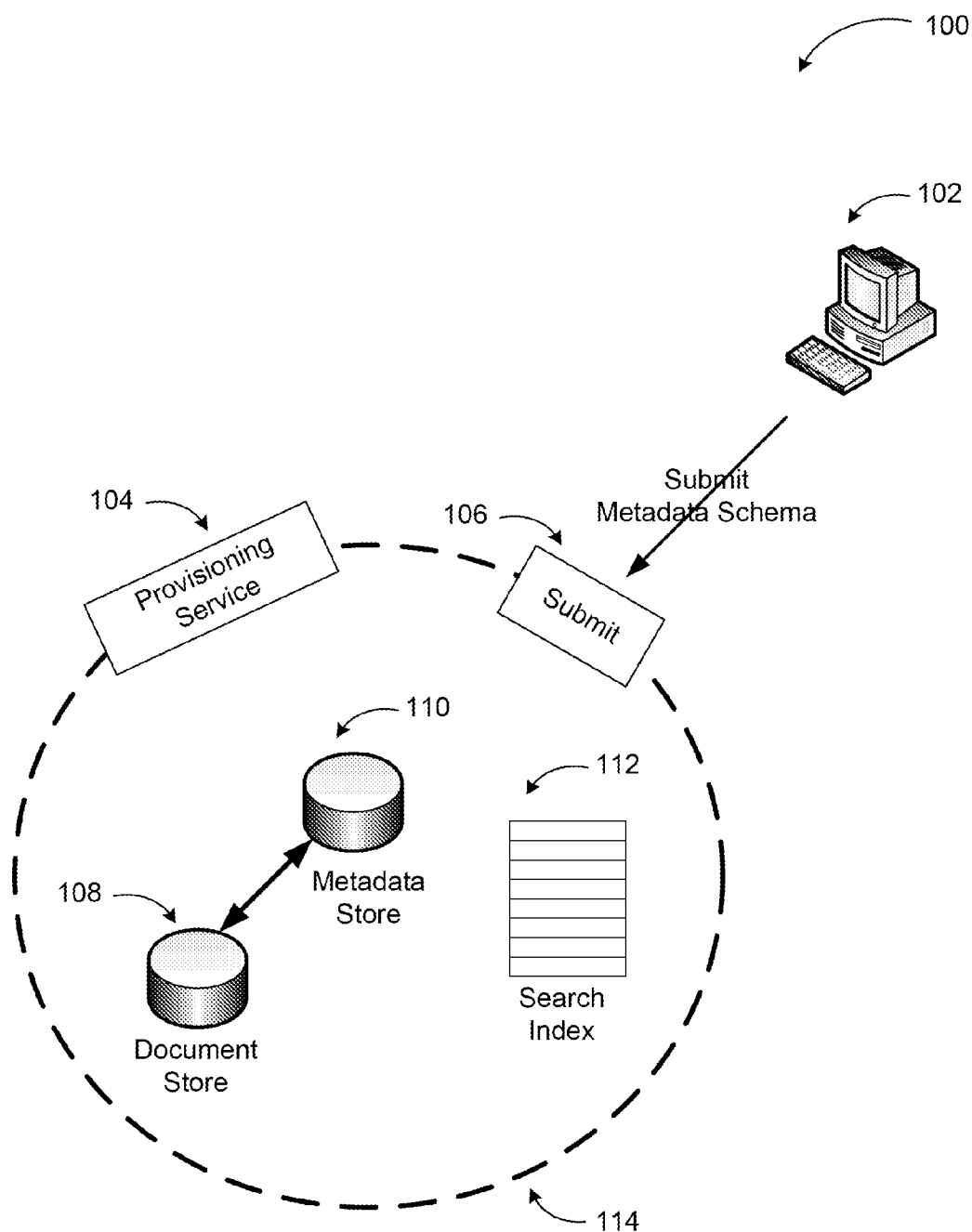
FIG. 1 illustrates an example service platform with search capability for documents based on their metadata properties using a classifier model for prediction according to embodiments.

Referring to FIG. 1, an example service platform with search capability for documents based on their metadata properties using a classifier model for prediction is illustrated in diagram 100, Service platforms may take many forms and configurations. Typically, a service platform is associated with multiple customers, whose clients are served through the platform based on the parameters and content provided be each customer. For example, a product support service for a computer products provider may provide support documents (and/or online help services) for a variety of products and components that may be part of the systems sold by the provider. These products and components may include hardware and software from various vendors and may involve licensing and similar permission issues. Thus, a service platform designed to provide a uniform support experience to the users of the product support service may receive documents from many sources utilizing various types of metadata. Thus, a service platform may perform a search by filtering results for a user.

Example service platform 114 includes document store 108 and metadata store 110 for storing documents and their metadata submitted by customers (e.g. customer 102) through the submit module 106. Search index 112 may be generated to perform efficient searches on the stored documents and metadata employing filtering techniques. Provisioning service 104 may manage provisioning of schemata among various metadata types submitted by different clients.

According to one embodiment, a classifier model based prediction algorithm may be used to compute a probability of a document being relevant for a user defined query with metadata properties being used to filter results. At query time, a user may specify which metadata properties they wish to search over. A sparse matrix of terms and metadata properties is condensed and the classifier model table joined with the metadata property table while applying the filter. A probability of the document being relevant can then be computed based on the document list satisfying the filter.

A system according to embodiments is not limited to the example system and its components described above. Dynamic metadata filtering for classifier prediction may be implemented with fewer or additional components performing additional or fewer tasks using the principles described herein.

Figure 2:
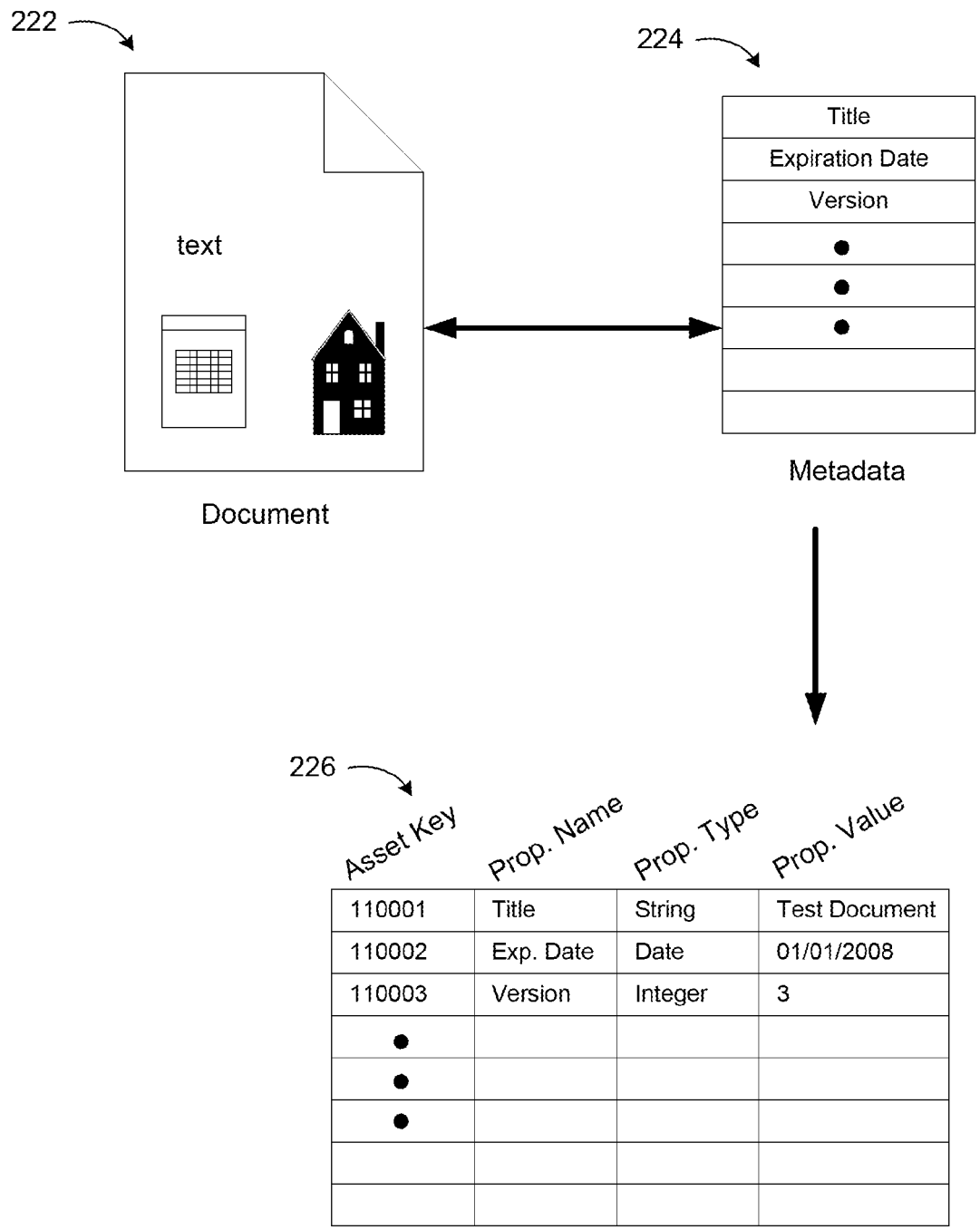
FIG. 2 illustrates an example document, its associated metadata, and a metadata property table based on the metadata.

FIG. 2 illustrates an example document, its associated metadata, and a metadata property table based on the metadata. Metadata is used to facilitate the understanding, use and management of data and vary with the type of data and context of use. For example, in the context of a library, where the data is the content of the titles stocked, metadata about a title might typically include a description of the content, the author, the publication date and the physical location. Metadata about a collection of data items, a computer file, might typically include the name of the file, the type of file, and the name of the data administrator.

Metadata is generally stored according to a well-defined hierarchical structure, called a schema. Metadata is frequently stored in a central location and used to help organizations standardize their data. Usually it may be difficult to distinguish between (raw) data and metadata because something can be data and metadata at the same time (e.g. the headline of an article may both its title—metadata—and part of its text—data. Furthermore, data and metadata may exchange their roles. Thus, the labeling depends on the point of view.

Search queries using metadata can save users from performing more complex filter operations manually. It is now common for web browsers and media management software to automatically download and locally cache metadata, to improve the speed at which files can be accessed and searched.

As shown in FIG. 2, a document 222 may include text, images, and other embedded objects such as audio objects, video objects, and the like. Metadata 224 associated with the document 222 may include general properties associated with the entire document such as the title of the document, an expiration date, a version of the document, and the like. Metadata 224 may also include specific metadata associated with sections of the document (sometimes called tags) such as semantic labels associated with specific strings of text, properties associated with embedded objects, and the like. Moreover, metadata properties such as those described above may be single valued or multi-valued. For example, a document may have multiple authors. Thus, the metadata property defining the authors for the document may include as many values as the number of authors.

Metadata property table 226 includes a list of example metadata properties (title, expiration date, and version). Each document (or asset) may be assigned a unique identifier (asset key) by the service platform enabling rapid access and reference to the document. Each document (asset) can have a number of metadata properties, based on the metadata schema. Each property has a name and a type (e.g. string, date, integer, etc.). While metadata property table 226 shows a single value for each listed property, the properties may also be multi-valued as discussed above. In that case, the table may include as many columns as the highest number of values of the multi-valued properties.

Figure 3:
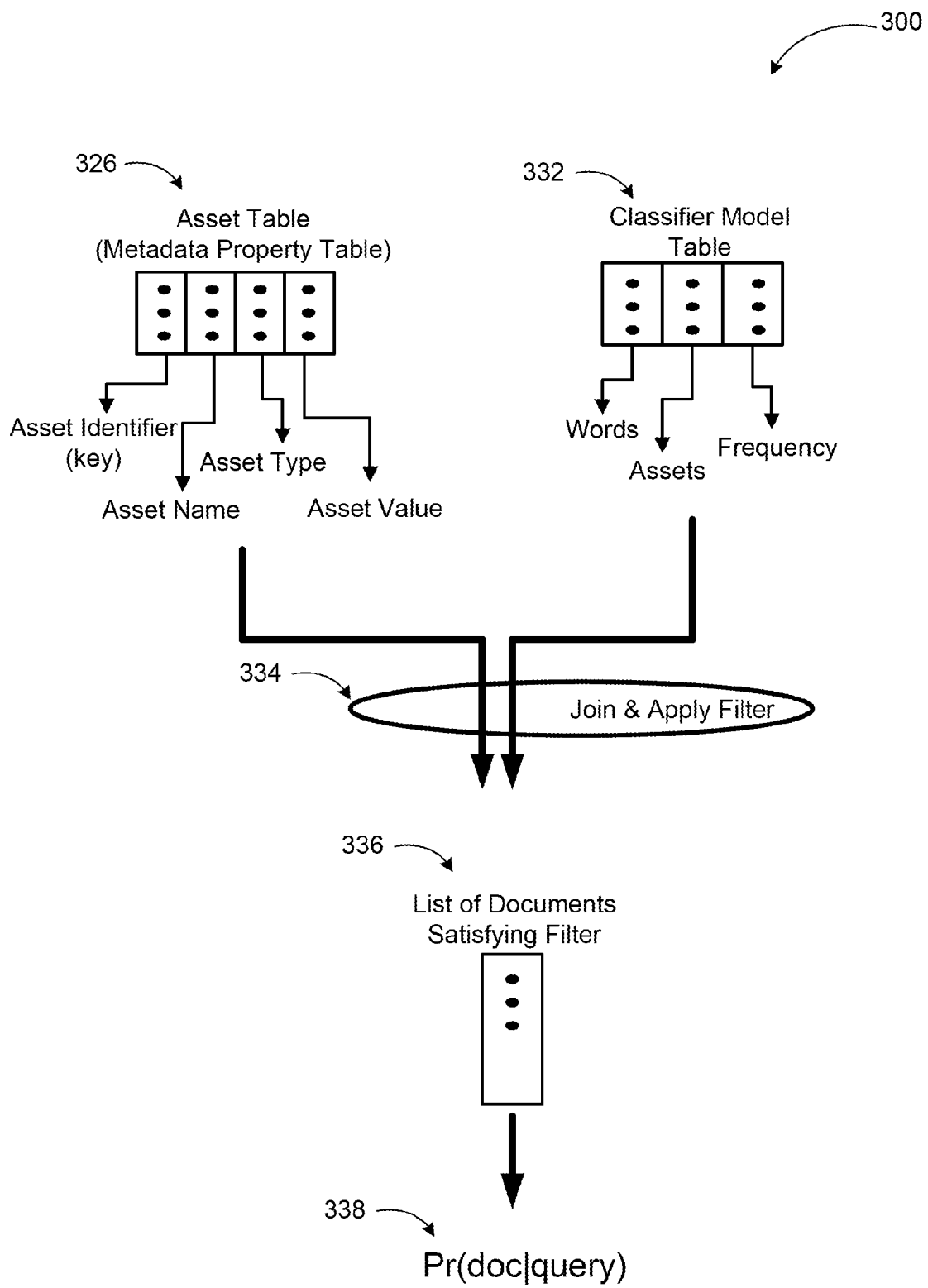
FIG. 3 is a conceptual diagram illustrating joining and filtering of a metadata property table and a classifier model table resulting in computation of a query probability.

FIG. 3 is a conceptual diagram illustrating joining and filtering of a metadata property table and a classifier model table resulting in computation of a query probability. Classifiers may be used for predicting search results in content storage systems such as assistance platforms, which are services that provide help documentation assistance to users of one or more customers based on documentation provided by the customers and queries defined by users. Such platforms may include a large number of documents. Thus, use of classifiers may help reduce usage of processing and other system resources in such systems.

The classification or description scheme is usually based on the availability of a set of patterns that have already been classified or described. This set of patterns is termed the training set and the resulting learning strategy is characterized as supervised learning. Learning can also be unsupervised, in the sense that the system is not given an a priori labeling of patterns, instead it establishes the classes itself based on the statistical regularities of the patterns.

The classification or description scheme usually uses one of the following approaches: statistical (or decision theoretic), syntactic (or structural). Statistical classification is based on statistical characterizations of patterns, assuming that the patterns are generated by a probabilistic system. Structural classification is based on the structural interrelationships of features. A wide range of algorithms can be applied for classification, from very simple Bayesian classifiers to much more powerful neural networks.

As discussed previously, a classifier is a statistical model built on a set of training data (a list of records of input features and corresponding correct answers) that can be used to predict relevant results for other input features. While many different classifier models may be used to predict search results, a Naïve Bayesian probability model is used herein to describe example embodiments. It should be noted, that embodiments are not limited to Bayesian models. Indeed, any algorithm that calculates the probability that a document is relevant based on query terms can be utilized to implement dynamic metadata filtering for classifier prediction.

The Naïve Bayesian probability model is a classifier trained on data that maps user input queries to relevant documents (e.g. identifiers of content in an assistance platform). For new queries received at runtime, the classifier predicts relevant results by computing the probability of a document given a query, or Pr(doc|query).

There are many different types of Bayesian models. One example model uses a "Bernoulli" event model, in which queries are represented mathematically with V bits $w_1 \ldots w_V$, where $w_i$ is the $i^{th}$ word (or term) in the query; if the term is in the query, $w_i=1$, and if the term is not in the query, $w_i=0$. V is typically large, so a sparse representation of the bit string is used in practice. The Naïve Bayesian formula is:

$$Pr(doc \mid query) = \frac{Pr(doc, query)}{Pr(query)} = \frac{Pr(doc)Pr(query \mid doc)}{Pr(query)} \quad (1)$$

where $$Pr(query \mid doc) = \prod_{w_i \in query} Pr(w_i = 1 \mid doc) \prod_{w_i \notin query} Pr(w_i = 0 \mid doc) \quad (2)$$

If the query contains Q terms, the straight-forward computation of Pr(query|doc) involves a product over the Q terms in the query, and the (V−Q) remaining terms. This is an O(V) computation. However, Pr(query|doc) can also be rewritten as:

$$Pr(\text{query} \mid doc) = \text{cache } (doc) \frac{\prod_{w_i \in \text{query}} Pr(w_i = 1 \mid doc)}{\prod_{w_i \in \text{query}} Pr(w_i = 0 \mid doc)} \quad (3)$$

$$\text{cache } (doc) = \prod_{w_i \in \{1 \ldots V\}} Pr(w_i = 0 \mid doc) \quad (4)$$

The rewritten version caches the probability of not seeing any terms in a given document and then adjusts the cached probability according to what actually occurs in the query. The cache is independent of a given query, and can be pre-computed at training time. At runtime, given a query with Q terms, the re-factored computation is O(Q). In practice, it may be more convenient to perform this computation as a summation of logarithms of probabilities, instead of as a product of probabilities:

$$\log Pr(\text{query} \mid doc) = \log \text{cache}(doc) + \sum_{w_i \in \text{query}} termprob(i, doc) \quad (5)$$

$$termprob(i, doc) = \log Pr(w_i = 1 \mid doc) - \log Pr(w_i = 0 \mid doc) \quad (6)$$

The term probabilities are derived from the raw counts of the training set, which is comprised of click-through data:
freq(doc, w)—co-occurrence count of the word (term) w within the document (doc)
freq(doc)—occurrence count of the document (doc) in the click-through training set
total—total frequency of click-throughs in the training set.
When using the classifier to predict relevant documents for given input queries, the documents often need to be filtered with the specified metadata property values, such as author name, creation date, etc. Such metadata properties are commonly stored in database tables and cannot be used with classifier models directly. Hence, the filter is usually applied to the classifier results after prediction, requiring the unnecessary computation of Pr(doc|query) for the documents filtered out later.

According to some embodiments, the classifier model may be stored in the database tables as well. Instead of calculating the probability Pr(doc|query) (p1) using the full classifier model, the classifier model table 332 and the metadata property table 326 may be joined and the metadata filter applied (334) to obtain the list of documents 336 satisfying the filter. Then, Pr(doc|query) (p2) (338) may be computed using the sub-model. For any documents doc1 and doc2, p1(doc1)>p1(doc2) if and only if p2(doc1)>p2(doc2). Thus, the same list of results is sorted by relevance (Pr(doc|query)).

According to embodiments, a classifier is used to predict relevant results with arbitrary filtering conditions specified by the user. Such filtering conditions are dynamically translated to an SQL where-clause for querying the classifier table joined with the metadata property table. Furthermore, classifier models do not need to be rebuilt even when the set of metadata properties are modified.

While specific statistical modeling and prediction techniques are used and described, a system according to embodiments is not limited to the definitions and examples described above. Dynamic metadata filtering for classifier prediction may be provided using additional or fewer steps and techniques.

Figure 4:
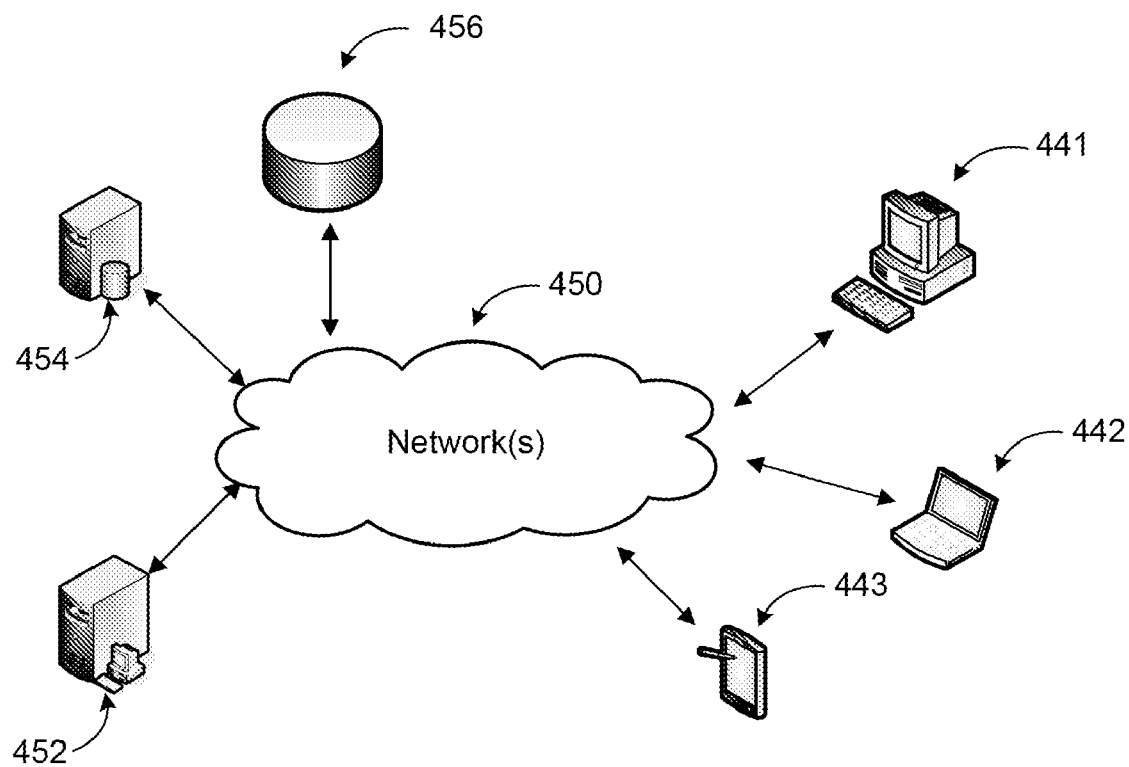
FIG. 4 is an example networked environment, where embodiments may be implemented.

FIG. 4 is an example networked environment, where embodiments may be implemented. Document search systems using metadata properties may be implemented locally on a single computing device or in a distributed manner over a number of physical and virtual clients and servers. They may also be implemented in un-clustered systems or clustered systems employing a number of nodes communicating over one or more networks (e.g. network(s) 450).

Such a system may comprise any topology of servers, clients, Internet service providers, and communication media. Also, the system may have a static or dynamic topology. The term "client" may refer to a client application or a client device. While a networked system implementing a document search system with dynamic metadata filtering for classifier prediction may involve many more components, relevant ones are discussed in conjunction with this figure.

A prediction engine capable of predicting search results in a document search system with metadata properties according to embodiments may be implemented as part of a service platform in individual client devices 441-443 or executed in server 452 and accessed from anyone of the client devices (or applications). Data stores associated with searchable documents and their metadata may be embodied in a single data store such as data store 456 or distributed over a number of data stores associated with individual client devices, servers, and the like. Dedicated database servers (e.g. database server 454) may be used to coordinate data retrieval and storage in one or more of such data stores.

Network(s) 450 may include a secure network such as an enterprise network, an unsecure network such as a wireless open network, or the Internet. Network(s) 450 provide communication between the nodes described herein. By way of example, and not limitation, network(s) 450 may include wired media such as a wired network or direct-wired connection, and wireless media such as acoustic, RF, infrared and other wireless media.

Many other configurations of computing devices, applications, data sources, data distribution systems may be employed to implement dynamic metadata filtering for classifier prediction in document searches. Furthermore, the networked environments discussed in FIG. 4 are for illustration purposes only. Embodiments are not limited to the example applications, modules, or processes.

Figure 5:
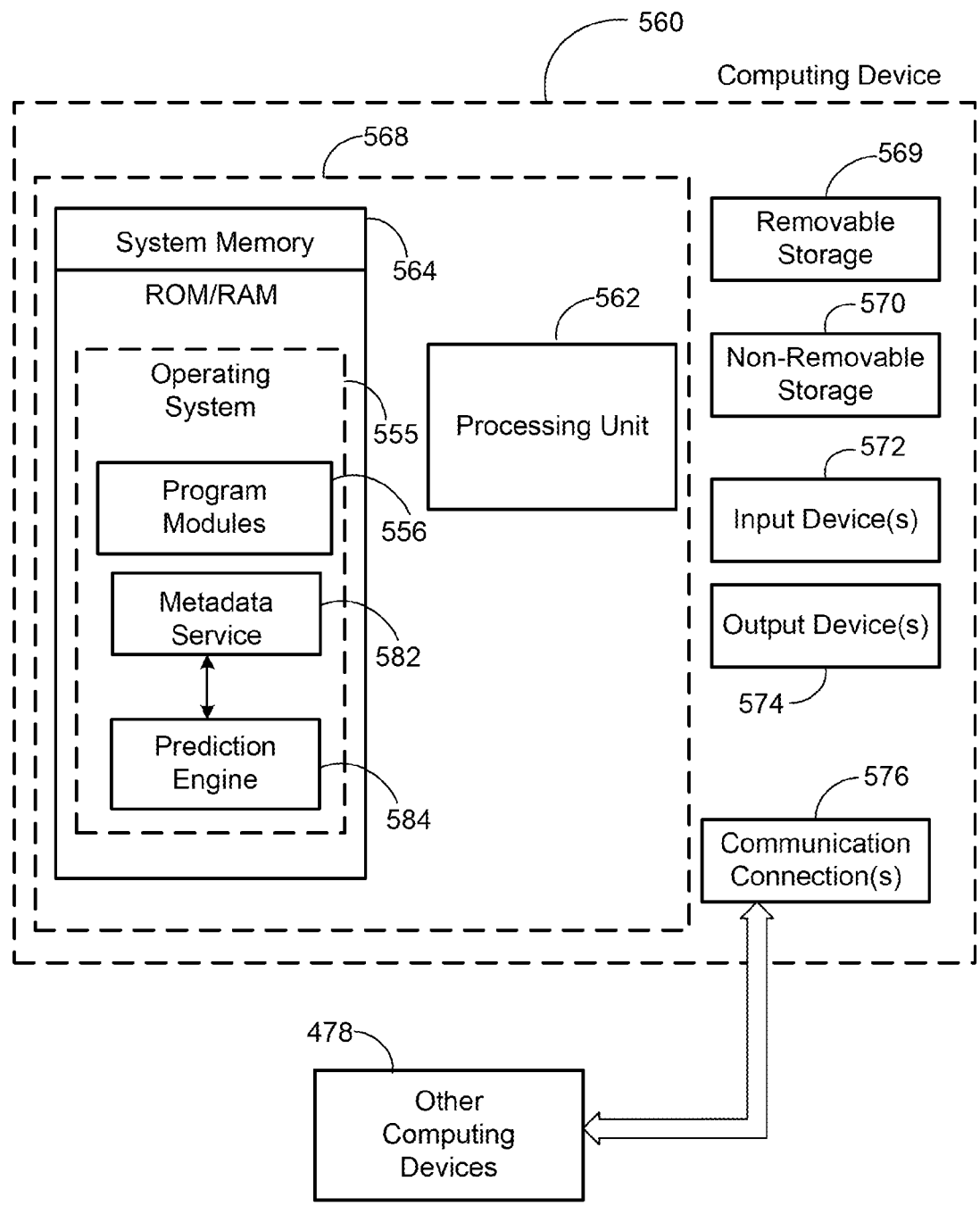
FIG. 5 is a block diagram of an example computing operating environment, where embodiments may be implemented.

FIG. 5 and the associated discussion are intended to provide a brief, general description of a suitable computing environment in which embodiments may be implemented. With reference to FIG. 5, a block diagram of an example computing operating environment is illustrated, such as computing device 560. In a basic configuration, the computing device 560 may be a server providing document search service and typically include at least one processing unit 562 and system memory 564. Computing device 560 may also include a plurality of processing units that cooperate in executing programs. Depending on the exact configuration and type of computing device, the system memory 564 may be volatile (such as RAM), non-volatile (such as ROM, flash memory, etc.) or some combination of the two. System memory 564 typically includes an operating system 555 suitable for controlling the operation of a networked computing device, such as the WINDOWS® operating systems from MICROSOFT CORPORATION of Redmond, Wash. The system memory 564 may also include one or more software applications such as program modules 556, metadata based search capable service platform 582, and prediction engine 584.

Metadata based search capable service platform 582 may be an individual application or a cluster of interacting applications that provides a variety of services to clients associated with computing device 560. Prediction engine 584 may perform computation of classifier prediction for document search results based on metadata properties and filtering of the results based on user defined queries, as described previously. This basic configuration is illustrated in FIG. 5 by those components within dashed line 568.

The computing device 560 may have additional features or functionality. For example, the computing device 560 may also include additional data storage devices (removable and/or non-removable) such as, for example, magnetic disks, optical disks, or tape. Such additional storage is illustrated in FIG. 5 by removable storage 569 and non-removable storage 570. Computer storage media may include volatile and nonvolatile, removable and non-removable media implemented in any method or technology for storage of information, such as computer readable instructions, data structures, program modules, or other data. System memory 564, removable storage 569 and non-removable storage 570 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 560. Any such computer storage media may be part of device 560. Computing device 560 may also have input device(s) 572 such as keyboard, mouse, pen, voice input device, touch input device, etc. Output device(s) 574 such as a display, speakers, printer, etc. may also be included. These devices are well known in the art and need not be discussed at length here.

The computing device 560 may also contain communication connections 576 that allow the device to communicate with other computing devices 578, such as over a wireless network in a distributed computing environment, for example, an intranet or the Internet. Other computing devices 578 may include server(s) that provide access to document stores, user information, metadata, and so on. Communication connection 576 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

The claimed subject matter also includes methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

Figure 6:
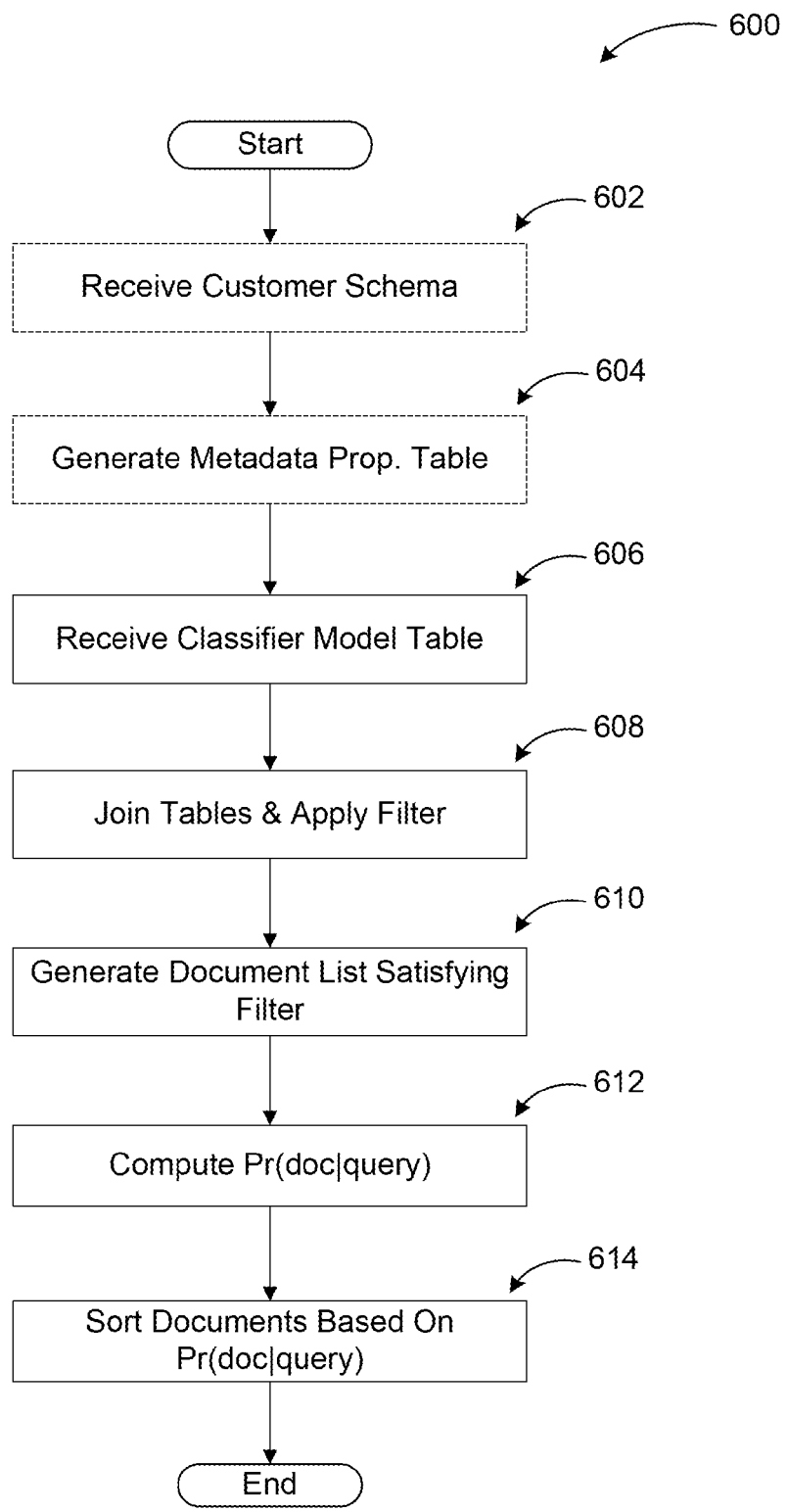
FIG. 6 illustrates a logic flow diagram of a process for dynamic metadata filtering according to embodiments.

FIG. 6 illustrates a logic flow diagram of a process 600 for dynamic metadata filtering according to embodiments. Process 600 may be implemented as part of a document search service.

Process 600 begins with optional operation 602, where a customer defined metadata schema is received. Processing advances from optional operation 602 to optional operation 604.

At optional operation 604, a metadata properties table is generated based on the properties associated with the metadata schema. Processing continues to operation 606 from optional operation 604.

At operation 606, a classifier model table is received. The classifier model table may be generated based on the documents already stored in the service platform. The full classifier model is typically a sparse matrix that can consume significant system resources when processed. Processing moves to operation 608 from operation 606.

At operation 608, the metadata properties table and the classifier model table are joined while applying a filter based on the user-defined query conditions. Such a filter may be dynamically translated to an SQL where-clause for querying the classifier table joined with the metadata property table. Processing moves to operation 610 from operation 608.

At operation 610, a list of documents satisfying the filter conditions is obtained. Processing advances from operation 610 to operation 612.

At operation 612, a query probability Pr(doc|query) may be computed based on the list of documents satisfying the filter conditions. Processing moves to operation 614 from operation 612.

At operation 614, the documents are sorted based on the computed probability Pr(doc|query). After operation 614, processing moves to a calling process for further actions.

The operations included in process 600 are for illustration purposes. Dynamic metadata filtering for classifier prediction may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method to be executed at least in part in a computing device for predicting query results in a document search system utilizing metadata properties, the method comprising:
   receiving a user-specified metadata schema, the user-specified metadata schema comprising metadata stored according to a hierarchical structure;
   generating the metadata property table based on the received schema;
   receiving the metadata property table;
   receiving a classifier model table, wherein the classifier model table comprises a sparse matrix of search terms, wherein the sparse matrix consumes significant system resources when processed;

joining the metadata property table and the classifier model table, wherein prior to joining the metadata property table and the classifier model table, the sparse matrix of search terms is condensed;

applying a filter condition to the joined table based on user-specified query conditions;

obtaining a list of documents satisfying the filter condition;

computing, using a sub-model, a probability of a document satisfying a user-specified query based on the list of documents, wherein computing, using the sub-model, comprises computing, for at least a first and second document in the list of documents, that a first probability of a first document is greater than a first probability of a second document if and only if a second probability of the first document is greater than a second probability of the second document, wherein the sub-model comprises the at least one filter condition applied to the joined metadata property table and the classifier model table; and presenting the probability to the user.

2. The method of claim 1, wherein the metadata property table includes a column for a property identifier, a column for a property name, a column for a property type, and a column for a property value.

3. The method of claim 1, wherein the classifier model table includes a column for a search term, a column for documents where each search term can be found, and a column for a frequency of occurrence of the search term.

4. The method of claim 1, wherein the metadata properties include at least one of a single value property and a multi-value property.

5. The method of claim 1, wherein the same classifier model table is used without modification when the metadata property table is modified due to an update.

6. The method of claim 1, further comprising:
dynamically translating the filter condition to a Structured Query Language (SQL) where-clause for querying the classifier model table joined with the metadata property table.

7. The method of claim 1, wherein the classifier model is based on a Naïve Bayesian probability model.

8. The method of claim 1, wherein the probability is computed using:

$$\log Pr(\text{query} \mid doc) = \log \text{cache}(doc) + \sum_{w_i \in query} termprob(i, doc)$$

$$termprob(i, doc) = \log Pr(w_i = 1 \mid doc) - \log Pr(w_i = 0 \mid doc)$$

where term probabilities (termprob) are derived from raw counts of a training data set associated with the classifier model.

9. A system for predicting query results in a document search system utilizing metadata properties, the system comprising:
a memory;
a processor coupled to the memory, capable of executing:
a service application configured to:
receive a user defined metadata schema, the user defined metadata schema comprising metadata stored according to a hierarchical structure;
generate a metadata property table based on the received schema;
a prediction engine configured to:
receive a classifier model table based on training data associated with documents stored by the document search system, wherein the classifier model table comprises a sparse matrix of search terms, wherein the sparse matrix consumes significant system resources when processed;
join the metadata property table and the classifier model table, wherein prior to joining the metadata property table and the classifier model table, the sparse matrix of search terms is condensed;
apply a filter condition to the joined table based on user-specified query conditions;
obtain a list of documents satisfying the filter condition; and
compute, using a sub-model, a probability of a document satisfying a user-specified query based on the list of documents, wherein computing, using the sub-model, comprises computing, for at least a first and second document in the list of documents, that a first probability of a first document is greater than a first probability of a second document if and only if a second probability of the first document is greater than a second probability of the second document, wherein the sub-model comprises the at least one filter condition applied to the joined metadata property table and the classifier model table.

10. The system of claim 9, wherein the service application is further configured to provide the probability to another application for presentation to a user requesting the query conditions.

11. The system of claim 9, further comprising:
a document store for storing documents searchable based on their metadata properties; and
a metadata store for storing metadata schema associated with the stored documents.

12. The system of claim 9, wherein the prediction engine is further configured to utilize a statistical algorithm that provides a monotone relationship between a probability of a document satisfying the user-specified query conditions based on a full classifier model and the probability of the document satisfying the user-specified query based on the list of documents.

13. The system of claim 12, wherein the statistical algorithm is based on a Naïve Bayesian model using a Bernoulli event model.

14. One or more computer-readable storage media, wherein the one or more computer-readable storage media do not consist of a propagated data signal, the one or more computer-readable storage media having stored thereon computer executable instructions that, when executed by a processor, predict query results in a document search system utilizing metadata properties, the instructions comprising:
receiving custom metadata schema, the custom metadata schema comprising metadata stored according to a hierarchical structure;
generating a metadata property table based on the received schema;
receiving a classifier model matrix based on a training data set associated with documents processed by the system, wherein the classifier model matrix comprises a sparse matrix of search terms, wherein the sparse matrix consumes significant system resources when processed;

generating a classifier model table from the sparse classifier model matrix;

joining the metadata property table and the classifier model table, wherein prior to joining the metadata property table and the classifier model table, the sparse matrix of search terms is condensed;

applying at least one filter condition to the joined table based on user-specified query conditions;

obtaining a list of documents satisfying the at least one filter condition; and computing, using a sub-model, a probability of a document satisfying a user-specified query based on the list of documents, wherein computing, using the sub-model, comprises computing, for at least a first and second document in the list of documents, that a first probability of a first document is greater than a first probability of a second document if and only if a second probability of the first document is greater than a second probability of the second document, wherein the sub-model comprises the at least one filter condition applied to the joined metadata property table and the classifier model table.

15. The one or more computer-readable storage media of claim 14, wherein the instructions further comprise:

dynamically translating the at least one filter condition to an SQL where-clause for querying the classifier model table joined with the metadata properties table.

16. The one or more computer-readable storage media of claim 14, wherein the metadata property table includes a column for a property identifier, a column for a property name, a column for a property type, and a column for each property value; and wherein the classifier model table includes a column for a search term, a column for documents where each search term can be found, and a column for a frequency of occurrence of the search term.

17. The one or more computer-readable storage media of claim 14, wherein the instructions further comprise:

enabling use of multi-value properties by generating row-based property tables that include a separate row for each value of a multi-value property and joining the row-based property tables with the classifier model table.

18. The one or more computer-readable storage media of claim 14, wherein the instructions further comprise:

enabling a query for performing the search to define a plurality of schemas to be included in the search.

* * * * *